PROCESSES OF MAKING MICROPOROUS POLYMER SHEETS
Filed April 17, 1967
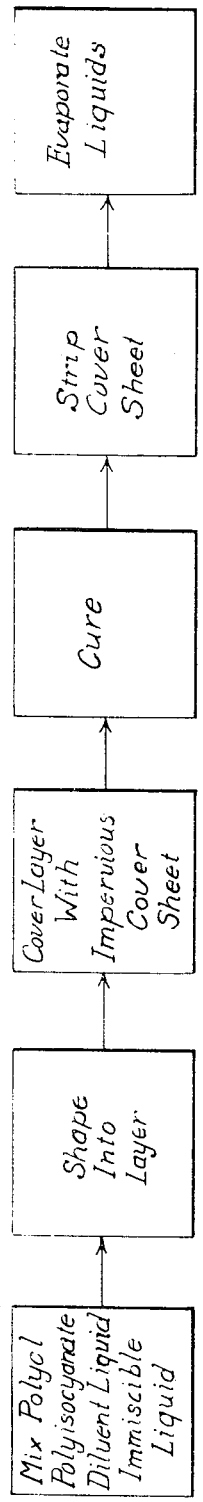
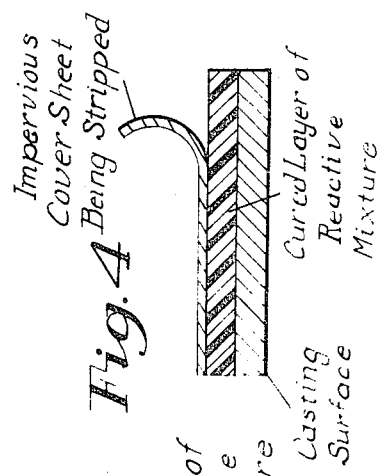
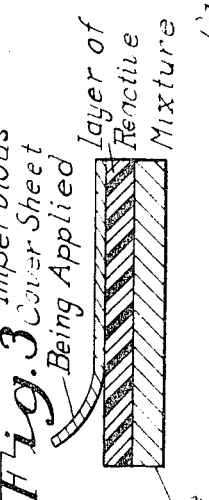
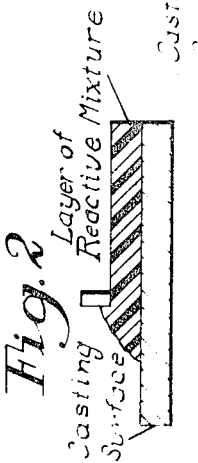
Inventor
Shu-Tung Tu
By his Attorney
Benjamin C. Pollard

United States Patent Office 3,539,388
Patented Nov. 10, 1970

3,539,388
PROCESSES OF MAKING MICROPOROUS
POLYMER SHEETS
Shu-Tung Tu, St. Albans, W. Va., assignor to USM Corporation, Flemington, N.J., a corporation of New Jersey
Filed Apr. 17, 1967, Ser. No. 631,171
Int. Cl. B29d 27/04; B44d 1/09; C09d 3/72
U.S. Cl. 117—161
3 Claims

ABSTRACT OF THE DISCLOSURE

A thin, microporous sheet having improved structural uniformity and permeability is formed by depositing a thin layer of a liquid emulsion of which the continuous phase includes a liquid polymeric material reactive to form a flexible, resilient solid together with a volatile diluent liquid miscible with the polymeric material, and the discontinuous phase is fine droplets of a volatile liquid immiscible and nonreactive with the continuous phase. The emulsion structure is preserved during solidification of the continuous phase by disposing a protective cover on the surface of the emulsion layer. When the emulsion has solidified the protective cover is removed and the volatile liquids are removed leaving a uniform, thin microporous sheet.

Field use, background and prior art relative
to the invention

This invention relates to improved processes for forming a microporous sheet or coating.

The ability to transmit substantial amounts of water vapor is an important requisite of materials for the manufacture of shoes garments and upholstery. Leather substitute materials heretofore known for such uses have generally comprised a resinous layer with pores or cells developed in it by chemical or mechanical means to provide porosity which would permit escape or transmission of moisture through such materials.

A porous sheet, or a supported porous layer in which there are provided pores or spaces of controlled size has been formed by depositing and solidifying a layer of an emulsion including fine droplets of immiscible liquid dispersed in a continuous liquid phase comprising reactive, preferably polymeric material and a volatile solvent. The polymeric material is converted through reaction to a tough, solidified, resilient condition with the dispersed liquid droplets held in the solidified material. The liquid of the droplets is then removed without expanding the solidified body leaving spaces constituting openings or pores in the solidified material.

Products so obtained have had good strength, appearance and other desirable properties for use in garments and shoe uppers. However, portions adjacent a surface of bodies so formed have been non-porous so that, although the major portions of the thickness have excellent connecting cell structure capable of giving breathabilty and water vapor permeability the over-all permeability has been reduced by the non-porous surface. Where breathability and water vapor permeability are important, the non-porous surface has been removed, generally by abrasion.

SUMMARY OF THE INVENTION

I have found that a thin microporous sheet with good toughness, flexibility and other desired properties but with improved uniformity and higher permeability may be formed by stabilizing a reactive emulsion system to maintain the cell structure; at the surface of the deposited layer until the reaction has solidified the emulsion to structure-stable condition. Solubility or miscibility of the reactive polymeric component in a true solvent component present in the emulsion decreases as the reaction progresses and molecular weight increases until a point is reached at which separation of polymeric component from tone solvent begins. Maintenance of the equilibrium between these separating components in the course of reaction resists breakdown of the structure of the emulsion and is achieved according to the present invention by providing a substantially impervious cover in intimate contact with the upper surface of the deposited layer. The cover is preferably applied at or promptly after the deposition of the liquid emulsion layer and is left in place until the reaction has proceeded at least to the point of gelation of the emulsion to structure-retaining condition.

Reference is made to the attached drawings in which:

FIG. 1 is a flow sheet of the present process;

FIG. II is a diagrammatic edge view of the formation of a liquid layer of the reactive mixture which will be solidified to form a microporous layer;

FIG. III is a diagrammatic edge view of the step of laying down an impervious cover sheet on the liquid layer; and FIG. IV is a diagrammatic edge view of the step of removing the impervious cover sheet from the solidified layer formed by reaction of the mixture which had been laid down as a liquid.

DESCRIPTION OF THE PREFERRED EMBODIMENTS

A variety of reactive materials may be used in the process. The reactive materials and nonsolvent liquid are selected for cooperation with each other so that reaction to solid condition occurs at temperatures at which the dispersed droplets can be kept in liquid condition. That is, where higher boiling point nonsolvent liquids are used in the dispersed phase, it is possible to use reactive materials which require higher temperatures for reaction than would be possible with lower boiling point nonsolvent liquids. Additionally reactive materials are selected on the basis of their known properties of providing toughness, flexibility, hardness and other physical properties required in the final product.

The preferred reactive materials are those for forming tough, flexible high strength polyurethane or polyurea reaction products. The reactive material may be a "one shot" mixture of an organic compound having at least two active hydrogens such as a polymeric polyol, e.g., polyalkylene ether polyol and/or polyester polyol, with a reactive compound having at least two reactive —NCO groups, e.g., a polyisocyanate. Alternatively, the reactive material may be a prepolymer system in which an —NCO terminated reaction product of polyol with excess polyisocyanate, is combined with chain extenders which may be polyhydroxy or polyamine compounds. The reactive material must be either a liquid or reducible to a liquid by heat or addition of a solvent.

Polyols useful in the "one shot" mixture or for forming the reactive prepolymer include substantially linear or only moderately branched polyether polyols, and substantially linear or moderately branched polyester polyols from the condensation of polybasic acids, e.g., adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or —COOH groups may be included in the compositions reactive to form polyester polyols to introduce moderate branching or cross linking.

Prepolymers are made by well understood procedures involving reaction of the polyether polyols or the polyester polyols with organic polyisocyanates including the toluene diisocyanates, methylene diisocyanates and the like. A proportion of polyisocyanate material having more than two reactive isocyanate groups may be included to provide a desired extent of cross linking.

The action of the nonsolvent poreforming liquid is primarily physical, that is, the nonsolvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial nonsolvency and nonreactivity with the polymeric material together with suitable volatility characteristics may be used. Complete insolubility is not necessarily provided an amount is used in excess of the solubility in the continuous phase. Normally liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition; but other substantially inert organic liquids such as liquid alkyl ethers, e.g., amyl ether may be used. It is also possible to use water as the dispersed liquid particularly with active chain extenders although this introduces the factor of reaction of a portion of the water with isocyanate groups and requires the use of additional water to compensate for that which may react. To avoid premature evaporation from the coating so that it can serve its space filling function until the coating has solidified, the poreforming liquid is chosen to have a boiling point above the selected reaction temperature and should preferably have a boiling point of at least about 100° C. and preferably at least 130° C. to allow use of temperatures giving a desirable rate of reaction of the polymeric material. On the other hand the liquid will be chosen with low enough boiling point for removal without heat injury to the coating or the base on which it may be disposed. Thus the liquid should ordinarily not contain substantial quantities of high boiling or low volatility components, and preferably over 90% of components should boil at a temperature of not over 450° F. It is to be understood that other means than evaporation, e.g., extraction may be used to remove high boiling or low volatility liquid and in such cases the upper temperature limit, i.e., the boiling point, does not apply.

Dispersion of droplets of the poreforming liquid in the liquid body of reactive polymeric material to form an emulsion in which the reactive polymeric material is the continuous phase, is effected by vigorous agitation during the course of addition of the pore-forming liquid to the body of polymeric material. Emulsifying agents are useful to aid in dispersing the liquid in the polymeric material and to stabilize the resulting emulsion. The selection of emulsifying agents is readily made by a chemist acquainted with the techniques of emulsion forming. Preferred emulsifying agents have included anionic and nonionic surface active agents such as commercially available silicone emulsifiers, partial long chain fatty acid esters and the polyoxyalkylene derivatives of such esters, also sulfuric acid esters of long chain fatty alcohols, etc.

The amount of poreforming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.001 to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate.

In the two step process, an —NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'-methylene-dianiline, 4,4'-methylene-bis-(2,-chloroaniline) trimethylolpropane, m-phenylediamine, 1,4 butane diol and triethanolamine.

In these reactions a quantity of true solvent is added to the polymeric material, either the polymeric polyol or the —NCO terminated prepolymer. The quantity of true solvent to be used will vary depending on the nature of the reaction components. Thus solid or high viscosity liquid reactive components will call for higher proportions of true solvent. Ordinarily, amounts used will be from about 25% by weight to about 150% by weight based on the reactive material but somewhat higher or lower amounts may be used. Useful solvents include organic liquids substantially non-reactive with the polymeric material or other components of the composition and substantially immiscible with the pore-forming liquid. Volatile organic liquids such as methyl ethyl ketone and benzene are ordinarily used. The solvent reduces the viscosity of the polymeric material to facilitate the formation of an emulsion and also may be used to reduce the reaction rates between the polymer and the material reacted with the polymer to increase its molecular weight. The solvent slows down the reaction by dilution of the reagents and permits the mixture to remain fluid during the time required for batch processing.

The emulsion is shaped into a layer (see FIG. II) promptly after formation and before the reaction has proceeded to a point where gelling of the composition through increase in molecular weight has occurred. The layer may be formed by coating the emulsion on surfaces by any of a variety of means including spraying, brushing, dipping, knife spreading and so on. Coating thicknesses may range from very thin but continuous deposits, e.g., 8 mils wet thickness up to as high as 100 mils wet thickness.

Surfaces on which the layer may be formed include casting surfaces such as glass or the release sheet, e.g., silicone or other treated paper from which the resultant film may be stripped after solidification, and porous bases such as woven or nonwoven fibrous sheet material, paper, felt and so on, on which the deposited material will form a permanent coating.

For providing a porous film integrally united to a supporting layer the emulsion may be spread directly on the supporting surface where the viscosity of the emulsion and the openness of the surface to which applied are such that penetration does not occur to an excessive degree. Thixotropic additives such as silica aerogel are useful in giving viscosity characteristics resisting excessive penetration.

A substantially impervious protective cover is disposed on the upper surface of the deposited emulsion layer as the layer is formed, or promptly after it is formed (see FIG. II). The cover may be a release sheet such as a paper sheet carrying a nonadhesive deposit for example, of silicone, polytetrafluoroethylene, polychlorotrifluoroethylene, wax, polyethylene or polypropylene or may be a nonadhesive supported or unsupported resin or elastomer sheet. The protective cover, which is preferably flexible for convenience in handling, may be laid down on the emulsion layer by hand or by any of the known devices for laying a sheet down smoothly on a surface.

With the cover in place, the reaction of the polymeric progresses to gel and solidify the emulsion to a state in which the droplets of nonsolvent liquid are held in a solid matrix.

The protective cover is removed from the layer when the layer has become a stable solid (see FIG. IV) and the solvent and nonsolvent liquids are removed preferably by evaporation although they may be removed by liquid extraction if desired. The layer so obtained is substantially uniform and is porous from surface to surface. That is, the layer does not have the nonporous surface layer obtained when the cover is not used.

The mechanism by which the cover gives this improvement is not fully understood. The sheet does not serve as an envelope to retain expansion gas since there is neither development of gas nor expansion of the layer. It appears that the cover acts to control surface conditions to prevent premature separation of the reacting polymeric material from the solvent in the continuous phase. Also, apparently the cover opposes loss of nonsolvent liquid which might occur by syneresis or otherwise from portions of the layer adjacent the surfaces and also may act to provide physical support for surface portions of the reacting polymeric material of the layer. Patentability of the process is not based on correctness of these explanations since a novel and important improvement is obtained through covering the emulsion layer.

When the layer has solidified to an extent providing stability against collapse the layer may be separated from the carrier on which it is formed and subjected to further treatment to complete the cure. This further curing treatment, usually involving heating, insures removal by evaporation of both the true solvent and the liquid of the entrapped droplets as the cure is completed. It is to be observed that owing to the physical state of the solidified partially cured polymeric material at the time of this further heating, the liquid of the droplets is able to escape without notable enlargement of the pores, this escape occurring through passageways in the continuous phase of the polymeric material. The thickness of the film or article ordinarily decreases in the course of evaporation of the droplets.

The following example is given to aid in understanding the invention but it is to be understood that the invention should not be restricted to the materials, proportions or procedure of the example.

EXAMPLE 80 grams of a glycol-adipate polyesterurethane prepolymer having a molecular weight of about 1400 and containing approximately 6.2% reactive —NCO was mixed with 66 cc. of methyl ethyl ketone and 22 cc. of acetone and 4.4 grams of polyoxyalkylene derivative of sorbitan monooleate was added as emulsifier. 160 cc. of a liquid paraffinic hydrocarbon mixture having a boiling point range of 366° F. to 405° F. was added to the solution and emulsified by vigorous agitation. Fine droplets of the liquid hydrocarbon constituted the internal phase.

23 cc. of a 48% solution of methylene dianiline in methyl ethyl ketone was added to the emulsion and thoroughly mixed in. The emulsion was centrifuged to remove entrapped air bubbles and then cast as a film on a glass surface which had been treated with a release agent. One-half of the film was covered immediately with a silicone treated release paper which was deposited on the layer without disruption of the layer. At the end of 30 minutes the emulsion had set up to a firm gel and the cover sheet was removed. The gelled layer was then air dried at room temperature for 30 minutes and thereafter cured by heating for one hour at 85° C. and an hour at 170° C.

The cured product was tough and flexible. The portion of the sheet which had been covered was notably whiter than the portion that had not been covered. The product was stripped from the plate on which it was cast and the water vapor transmission rate was determined by standard procedure for the portion that had been covered and the portion that had not been covered. The average water vapor permeability for 4 samples cut from the portion of the sheet which had been covered was 2.35 grams/30 cm.$^2$/24 hrs./22 mils. The average water vapor transmission rate for 4 samples cut from the portion of the sheet which had not been covered was 0.80 gram/30 cm.$^2$/24 hrs./22 mils.

Having thus described my invention what I claim as new and desire to secure by Letters Patent of the United States is:

1. In a process for forming a microporous, water vapor permeable layer including the steps of providing a liquid emulsion of which the continuous phase comprises a liquid mixture reactive to form a tough, flexible, high strength elastomeric material, said reactive mixture comprising a mixture of an organic compound providing at least two reactive —NCO groups per molecule and an organic compound having at least two active hydrogens per molecule for reaction with said —NCO groups to form a resilient polyurethane and a volatile organic liquid diluent nonreactive with the compounds of said reactive mixture miscible with or soluble in at least one of said compounds of the reactive mixture, and the disperse phase of said emulsion comprising fine droplets of a volatile organic liquid substantially nonreactive with said compounds and substantially immiscible with said continuous phase, said liquid having a boiling point of at least about 100° C. and at least about 90% boiling below 232° C., said immiscible volatile organic liquid being present in amount of from 25% to about 300% by weight based on the weight of the reactive material, forming said emulsion into a layer on a supporting surface, reacting said mixture at a temperature below the boiling points of said volatile diluent liquid and said immiscible liquid to convert said layer to a solid entrapping the droplets and removing said diluent and said immiscible liquids, the improvement which comprises the steps of providing a substantially impervious cover on the exposed face of said layer of the liquid emulsion before substantial reaction of said compounds, thereafter reacting said compounds to bring the layer to solid state with said cover in place and without substantial expansion of said layer, stripping said sheet from said face after solidification of said reaction mixture and thereafter removing the diluent liquid and immiscible liquid from said layer.

2. The process for forming a microporous, water vapor permeable layer as defined in claim 1 in which the cover is removed from the layer and the layer is removed from the surface on which it is formed after the reactive mixture has gelled to shape-retaining condition but before complete cure of the reactive mixture, the diluent liquid and immiscible liquid are removed from the incompletely cured layer and the layer is subjected to higher temperatures after removal of said liquid.

3. The process for forming a microporous, water vapor permeable layer as defined in claim 2 in which said volatile diluent liquid is present to the extent of from about 25% to about 150% by weight based on the weight of said reactive mixture.

References Cited
UNITED STATES PATENTS

| | | |
|---|---|---|
| 2,956,310 | 10/1960 | Roop et al. _____ 264—216 |
| 3,100,721 | 8/1963 | Holden. |
| 3,108,009 | 10/1963 | Clancy et al. |
| 3,264,134 | 8/1966 | Vill et al. |
| 3,342,759 | 9/1967 | Short et al. _____ 260—2.5 |
| 3,413,184 | 11/1968 | Findlay et al. ____ 264—216 XR |

PHILIP E. ANDERSON, Primary Examiner

U.S. Cl. X.R.

117—155; 161—159, 406; 264—41, 53, 331